(12) United States Patent
Rey

(10) Patent No.: US 11,370,474 B2
(45) Date of Patent: Jun. 28, 2022

(54) STEERING COLUMN INCLUDING A ROTATIONAL BLOCKING DEVICE ACTUATED BY A MOTORIZATION

(71) Applicant: JTEKT EUROPE, Irigny (FR)

(72) Inventor: Laurent Rey, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 16/981,468

(22) PCT Filed: Mar. 13, 2019

(86) PCT No.: PCT/FR2019/050544
§ 371 (c)(1),
(2) Date: Sep. 16, 2020

(87) PCT Pub. No.: WO2019/175502
PCT Pub. Date: Sep. 19, 2019

(65) Prior Publication Data
US 2021/0024120 A1    Jan. 28, 2021

(30) Foreign Application Priority Data
Mar. 16, 2018 (FR) .................... 18/52263

(51) Int. Cl.
*B62D 1/19* (2006.01)
*B60R 25/0215* (2013.01)
*B62D 1/181* (2006.01)

(52) U.S. Cl.
CPC ........ *B62D 1/195* (2013.01); *B60R 25/02156* (2013.01); *B62D 1/181* (2013.01); *F16C 2326/24* (2013.01)

(58) Field of Classification Search
CPC .. B62D 1/195; B62D 1/181; B60R 25/02156; F16C 2326/24
See application file for complete search history.

(56) References Cited

U.S. PATENT DOCUMENTS

| 4,903,511 A * | 2/1990 | Niedzielski | ........... B60R 25/021 |
| | | | 70/184 |
| 7,410,190 B2 * | 8/2008 | Sawada | .................... B62D 1/19 |
| | | | 280/775 |

(Continued)

FOREIGN PATENT DOCUMENTS

| DE | 102016111473 A1 | 12/2016 |
| EP | 0499001 A1 | 8/1992 |

(Continued)

OTHER PUBLICATIONS

Jul. 2, 2019 International Search Report issued in International Patent Application No. PCT/FR2019/050544.

*Primary Examiner* — Darlene P Condra
(74) *Attorney, Agent, or Firm* — Oliff PLC

(57) ABSTRACT

Steering column for a motor vehicle including two telescopic drive shafts linked in rotation, allowing an axial sliding of a front shaft supporting a steering wheel, successively over, starting from the most forward position, a first range of depth adjustment of the position of this steering wheel, then a second damping range used in the case of an accident for damping an impact of the driver on the steering wheel, this column including an electric motorization for controlling the sliding, and an anti-theft blocking device blocking the rotation of one of the shafts, which is automatically engaged for an axial position for blocking the front shaft given by the motorization located in the second damping range.

11 Claims, 3 Drawing Sheets

(56) References Cited

U.S. PATENT DOCUMENTS

| | | | | |
|---|---|---|---|---|
| 2010/0122604 A1* | 5/2010 | Gustavsen | .......... | B60R 25/0222 |
| | | | | 74/552 |
| 2014/0311273 A1* | 10/2014 | Nagasawa | ............ | B22D 19/045 |
| | | | | 74/492 |
| 2016/0375928 A1* | 12/2016 | Magnus | .............. | F16H 25/2204 |
| | | | | 74/493 |
| 2017/0043746 A1* | 2/2017 | Caverly | ................ | B60R 25/023 |
| 2017/0361863 A1* | 12/2017 | Rouleau | ................ | B62D 1/195 |
| 2019/0226561 A1 | 7/2019 | Magnus | | |
| 2019/0367071 A1* | 12/2019 | Schacht | ................. | F16C 19/06 |

FOREIGN PATENT DOCUMENTS

| | | | | |
|---|---|---|---|---|
| EP | 0918000 | A1 | 5/1999 | |
| FR | 2861673 | A1 | 5/2005 | |
| FR | 3023243 | A1 | 1/2016 | |
| WO | WO-2019147032 | A1 * | 8/2019 | ............. B62D 1/184 |

* cited by examiner

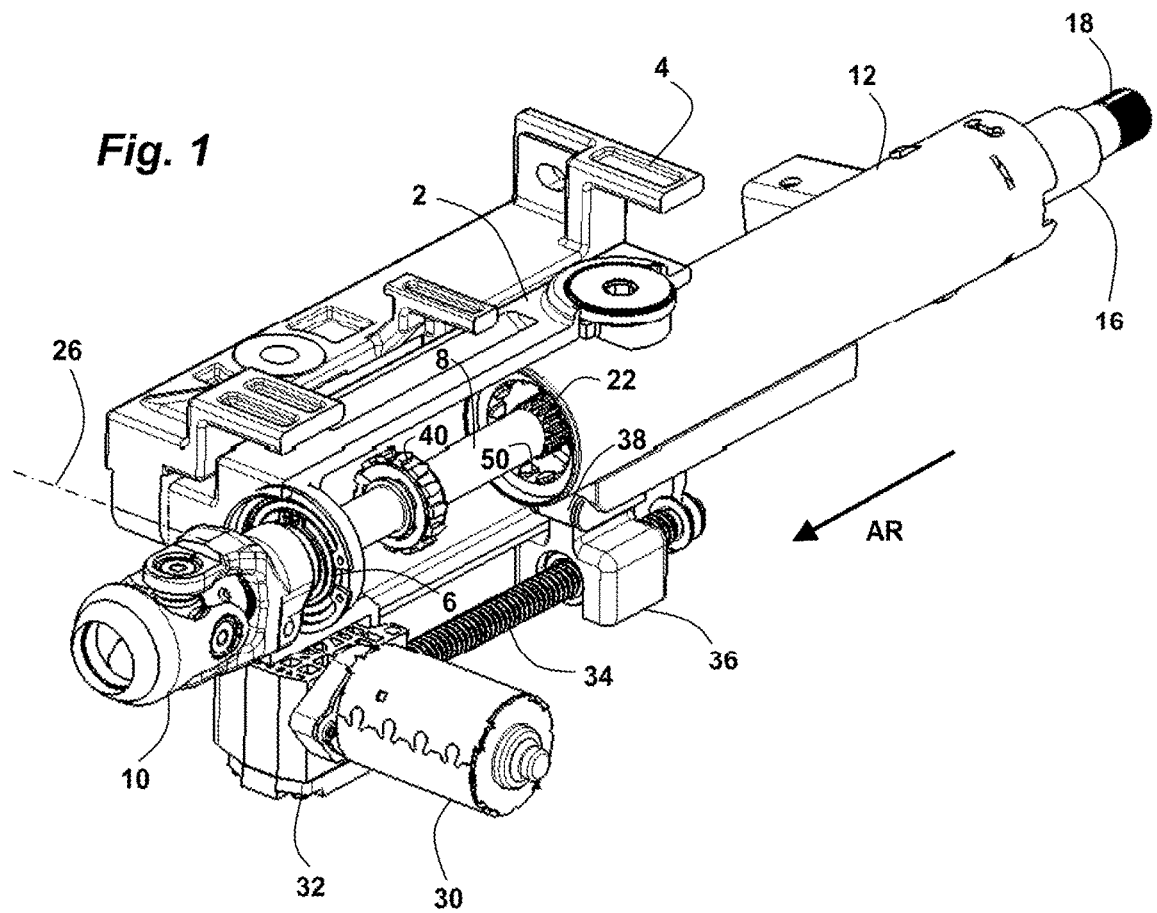
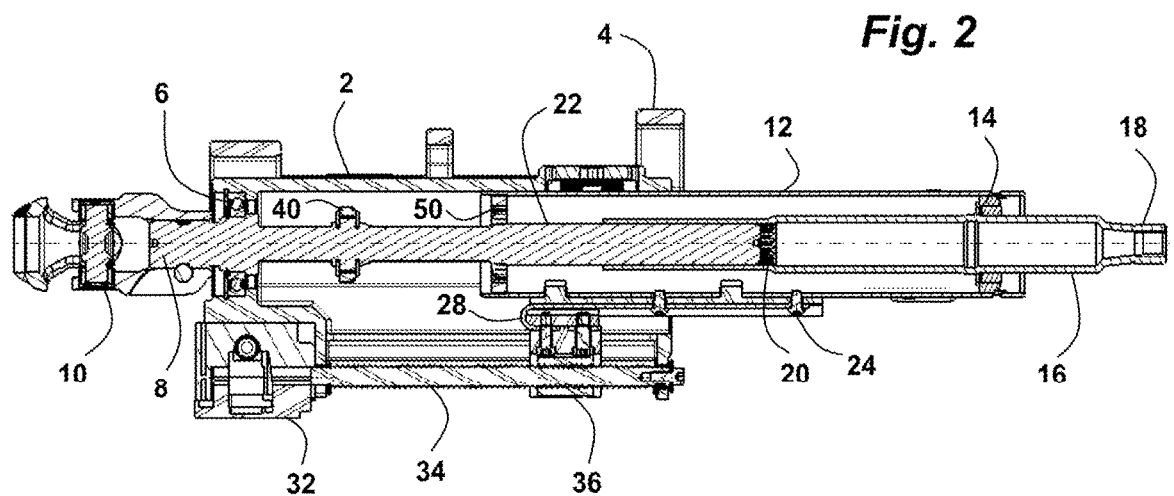

STEERING COLUMN INCLUDING A ROTATIONAL BLOCKING DEVICE ACTUATED BY A MOTORIZATION

BACKGROUND

The present invention concerns a motor vehicle steering column including an anti-theft system for blocking in rotation, as well as a method for controlling this steering column.

The motor vehicles include a steering column generally comprising a front upper shaft receiving, at the front end thereof, a steering wheel, linked in rotation to a lower shaft which drives a steering box carrying out the pivoting of the front steered wheels of the vehicle.

The two telescopic shafts can slide axially between them to ensure a depth adjustment of the position of the steering wheel within a first adjustment range forming an axial stroke of the steering wheel starting from its most forward position.

The sliding also ensures, during an impact on the front of the vehicle, a possibility of depression of the upper shaft over a second damping range coming after the first range, in order to carry out a damping absorbing an energy limiting the force applied by the driver on an airbag of the steering wheel.

It is known to arrange an electric motorization that carries out the longitudinal sliding of a guide tube receiving the front shaft to guide it, in order to perform, in an assisted or automatic manner, the adjustment of the depth position of the steering wheel.

Moreover, the steering columns include an anti-theft system for locking in rotation carrying out a blocking of a shaft of the column which is automatically actuated when the ignition key is removed, comprising a bolt linked to the support of the column, sliding to enter an opening formed on a blocking ring fastened around a shaft of the column in order to ensure its blocking in rotation. In particular, the bolt can be actuated by an electric motorization controlled by switching off the ignition.

A known blocking system, presented in particular by the documents FR-A1-2861673 and EP-A1-0918000, includes a friction device mounted between the housing of the bolt and the shaft for the first document, or between the column support and a sliding sleeve receiving axial immobilizing ribs disposed on the shaft for the second document, giving a possibility of sliding in rotation around this shaft above a predefined torque. In particular, the predefined sliding torque is comprised between 100 Nm to 200 Nm, it is preferably 150 Nm.

SUMMARY

In this manner, in the case of an attempted theft of the vehicle, the operator exerting a high torque on the steering wheel in order to try to break the blocking thereof, the blocking ring ends up rotating on the shaft before obtaining deformations of mechanical elements, or a breakage of these elements. In this manner, by limiting the force, a break of the locking allowing the theft is avoided, and without obtaining this break, a deformation of elements that would make driving dangerous and would require replacement.

It should be noted that the high torque allowing the blocking ring to slide requires an excessively high force on the steering wheel which makes the vehicle impossible to drive when the blocking is maintained.

However, by using an electric motorization for this blocking system, this assembly is bulky both in diameter and in axial length, and has a high mass as well as a high cost. In addition, the engagement control by the motor given by the on-board network of the vehicle as well as the operation of this motor should be fully secure to avoid an inadvertent blocking while driving the vehicle, which complicates this system.

The object of the present invention is in particular to avoid these drawbacks of the prior art.

For this purpose, it proposes a steering column for a motor vehicle including two telescopic drive shafts linked in rotation, allowing an axial sliding of a front shaft supporting a steering wheel, successively over, starting from the most forward position, a first range of depth adjustment of the position of this steering wheel, then a second damping range used in the case of an accident for damping an impact of the driver on the steering wheel, this column including an electric motorization for controlling the sliding, and an anti-theft blocking device blocking the rotation of one of the shafts, being remarkable in that the rotational blocking device is automatically engaged for an axial position for blocking the front shaft given by the motorization located in the second damping range.

An advantage of this steering column is that after having switched off the ignition, by using the existing motorization to perform the axial sliding of the front shaft in order to place it in the axial blocking position which is outside the first adjustment range used for the driving of the vehicle, the installation of a second motorization to actuate the locking system is avoided, which allows reducing the size, the mass as well as the costs of the steering column.

The steering column according to the invention may further include one or more of the following features, which can be combined with each other.

Advantageously, the axial position for blocking the front shaft is disposed before the end of the stroke of the second damping range. In this manner, in the case of an accident having caused the complete depression of the front shaft which comes to the end of this second range, the locking system has passed through the axial blocking position without remaining in it, which maintains the operational steering to continue to maneuver the vehicle if necessary, according to what certain regulations require.

Advantageously, the rotational blocking device includes an inner ring having axial teeth on the outer contour thereof, which are engaged between teeth disposed in an outer ring. This blocking system is simple to implement.

In this case, advantageously the axial teeth of the inner ring and the outer ring axially have tips on the side of the engagement on the other ring.

In addition, advantageously, the inner ring and the outer ring axially have a tip projecting axially from the other tips on the side of the engagement on the other ring.

Advantageously, the rotational blocking device includes a rotational sliding system limiting the torque transmitted by this device.

In this case, the sliding system advantageously includes an elastic annulus forming slots, disposed between one of the rings and the part supporting it.

Advantageously, the rotational blocking device includes an axial fuse system which can be broken in the case of an accident under the effect of an axial force when contacting two portions of the rotational blocking device, during the displacement of the front shaft in the second damping range.

In this case, the axial fuse system can include elastic clips made of plastic material, axially holding at least one of the rings.

In particular, the rotational blocking device can include an inner ring fastened on a rear shaft, and an outer ring fastened inside a guide tube carrying out a guide of the front shaft.

The invention further relates to a method for controlling a steering column comprising any one of the preceding features, which controls the electric motorization systematically after switching off the ignition of the vehicle to have the front shaft in its axial position for blocking in rotation.

BRIEF DESCRIPTION OF THE DRAWINGS

The invention will be better understood and other features and advantages will appear more clearly on reading the description below given by way of example, with reference to the appended drawings in which:

FIGS. 1 and 2 show respectively, in perspective with a partial cutaway and in axial section along a vertical plane, a steering column according to the invention;

DETAILED DESCRIPTION OF EMBODIMENTS

Figure 3:
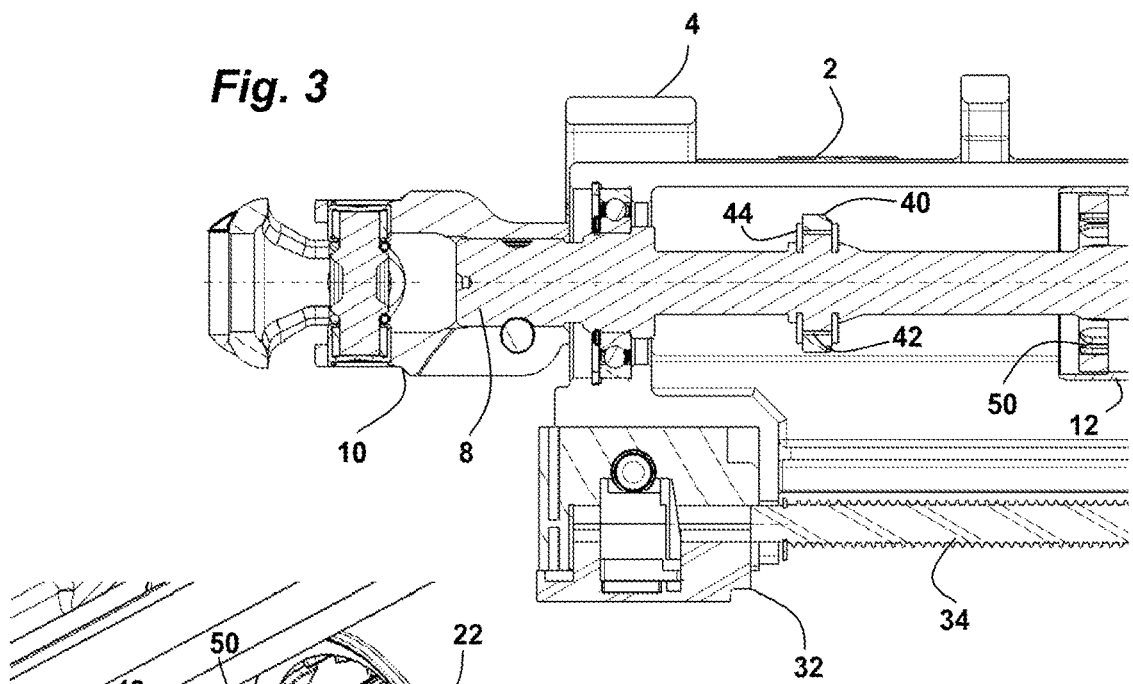
FIG. 3 is a partial enlargement of this axial section.
Figure 4:
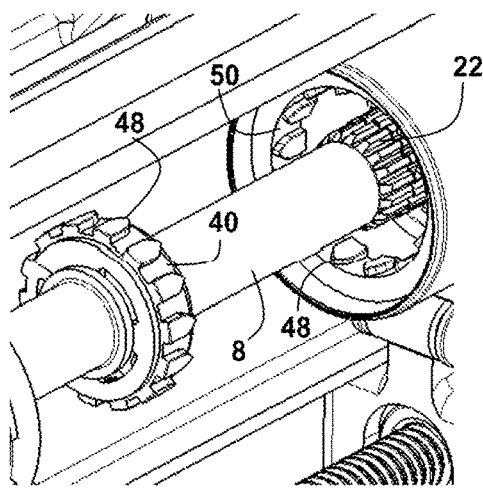
FIG. 4 is a partial enlargement of this perspective view.
Figure 5:
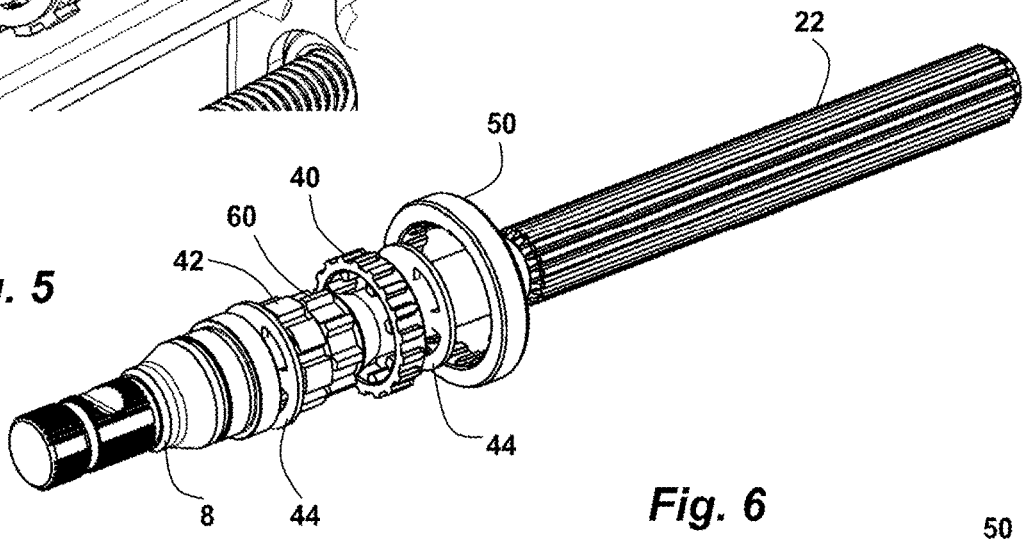
FIG. 5 is an exploded view of the rear shaft with the inner blocking ring.
Figure 6:
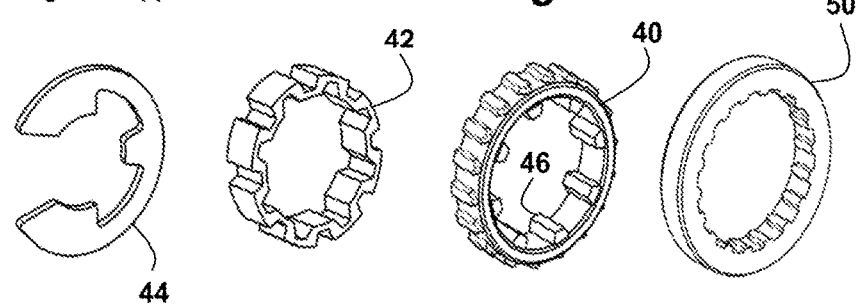
FIG. 6 details the inner blocking ring and the outer blocking ring.

FIGS. 1 and 2 show a fixed support 4 of a steering column equipped with upper tabs provided for fastening under a cross member of the vehicle dashboard, linked to a movable support 2 by a transverse axis pivot 26 to allow a height adjustment of the steering wheel. The movable support 2 forms a closed casing comprising within, on the rear side indicated by the arrow AR, a rear ball bearing 6 for guiding a rear shaft 8 disposed along a main axis forming a longitudinal direction.

The rear shaft 8 axially wedged in the movable support 2 by the rear ball bearing 6, includes at its rear end a dial 10 for linking to a shaft of the steering column, connecting it to a steering box of the vehicle.

A front sliding tube 12 guided in a bore of the movable support 2 allowing an axial sliding, includes at the front end thereof a front guide bearing 14 receiving a front shaft 16 of the steering column, which is axially wedged on the sliding tube by this front bearing.

In this manner, the front shaft 16 is free to rotate in the sliding tube 12, but drives this tube when it slides along the axis thereof.

The front shaft 16 is formed by a tube comprising at the front end thereof outer splines 18 for fastening a steering wheel, and on a rear length, inner splines 20 that are engaged on outer splines 22 formed around the rear shaft 8 to ensure the rotational connection.

An electric motorization 30 having an axis perpendicular to the longitudinal axis, drives a gear reducer 32 forming an angle transmission, which in turn drives a screw 34 arranged under the movable support 2, parallel to the main axis. A carriage 36 including a nut engaged in the screw 34, drives by a curved metal blade 28 the sliding tube 12 which is fastened to this blade by screws 24.

The curved metal blade 28 disposed parallel to the longitudinal axis, includes a 180° curvature so as to have its two ends one below the other, which are linked one to the carriage 36 and the other to the sliding tube 12. A rigid axial connection is thus obtained between the carriage 36 and the sliding tube 12 in order to perform the depth adjustments of the steering wheel.

In particular the screw-nut connection of the screw 34 and of the nut of the carriage 36 has irreversible kinematics, an axial thrust on this nut not causing a rotation of the screw thanks to a sufficiently small pitch of this screw in order to avoid misadjusting the depth position of the steering wheel if the driver applies an axial force thereon. For doing this, an inclination of the thread is advantageously carried out, relative to the axis of the screw 34, which is comprised between 8 and 20 degrees, which is preferably 12 degrees.

Figure 7A:
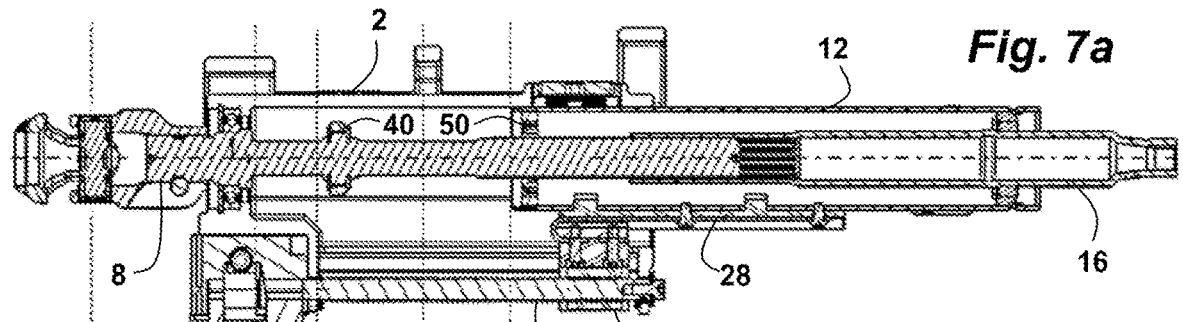
FIGS. 7a, 7b, 7c and 7d show, in axial section, this steering column disposed successively in the front adjustment position, in the rear adjustment position, in the locking position and in the fully depressed position after an accident.
Figure 7B:
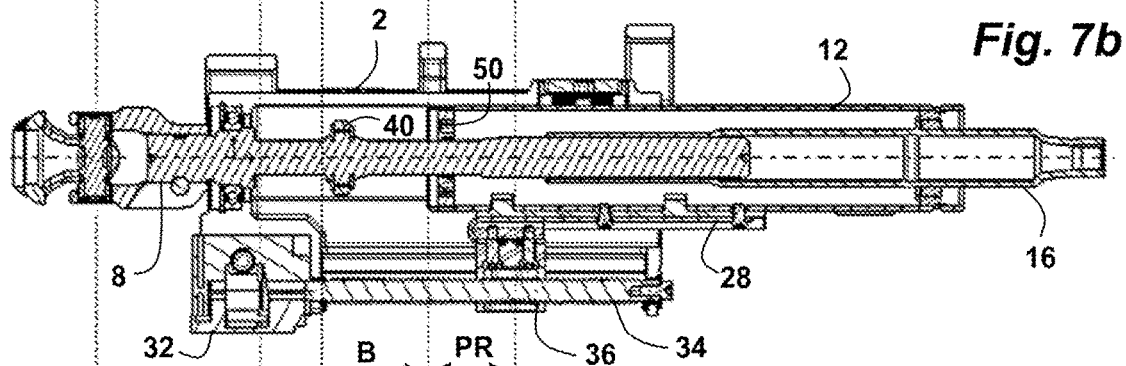

However, in the case of an impact on the front of the vehicle causing an inflation of the steering wheel airbag, the driver's torso applies a significant force on the steering wheel, transmitted by the front shaft 18 to the sliding tube 12 which is retained by the metal blade 28. For a sufficiently high force, the curvature of the metal blade 28 takes place gradually, by letting the sliding tube 12 moving backwards with an energy absorption, to reach, at the end of stroke, the bottom of the movable support 2, as shown in FIG. 7d.

Figure 7C:
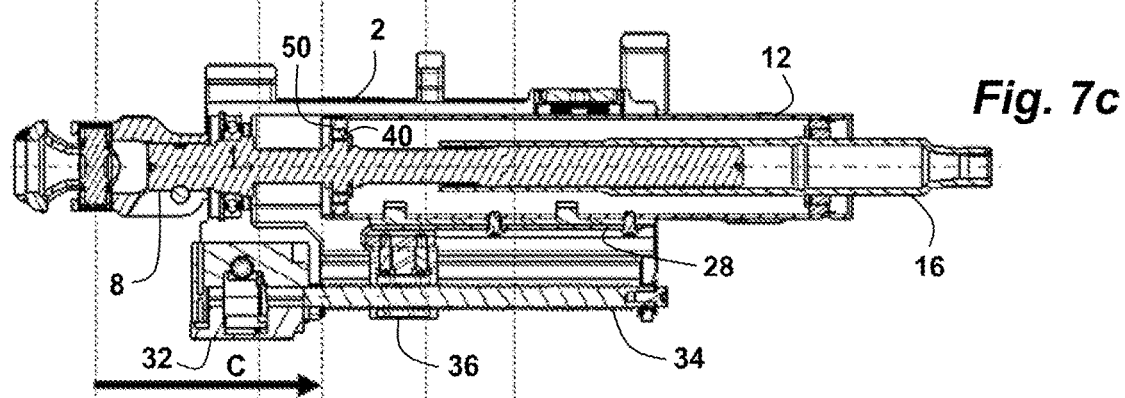
Figure 7D:
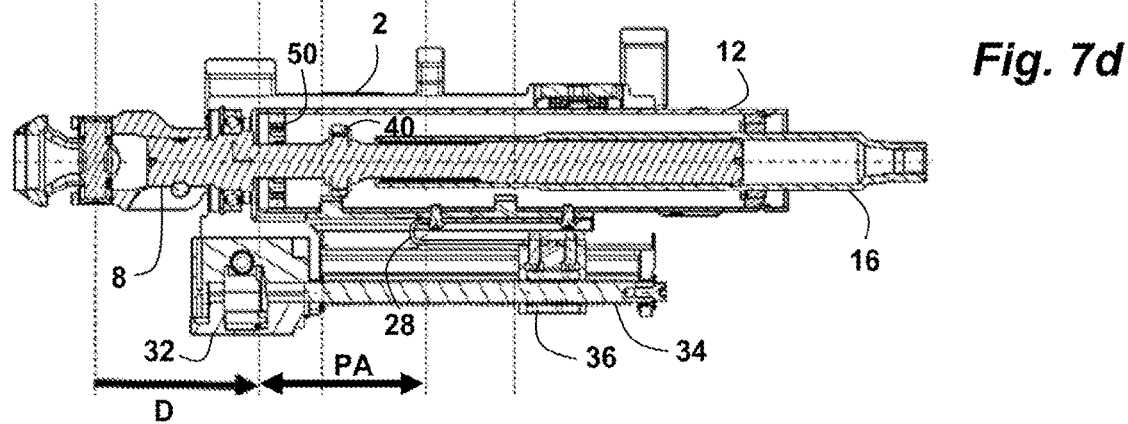

The rear shaft 8 supports an inner blocking ring 40 equipped on its contour with axial teeth, and the sliding tube 12 an outer blocking ring 50 equipped inside with corresponding axial teeth, which in a defined axial position of this tube shown in FIG. 7c, are engaged into each other in order to carry out an anti-theft rotational blocking of the steering.

FIGS. 3, 4, 5 and 6 show the outer ring 50 rigidly fastened in the rear portion of the sliding tube 12, comprising within a succession of axial teeth each terminating in a rearwardly facing tip 48.

The inner ring 40 fastened in a flexible manner on the rear shaft 8, includes, on the outside, a succession of axial teeth each terminating in a forwardly facing tip 48, so as to be able to be engaged in the teeth of the outer ring 50 by an axial sliding.

An elastic annulus 42 made of elastomer has a contour forming a succession of slots, including, on the inner side, recesses receiving corresponding axial toothings 60 formed around the rear shaft 8, and on the outer side, recesses receiving corresponding axial toothings 46 formed in the inner ring 40. The inner diameter of the teeth of the outer ring 50 is larger than the outer diameter of the teeth of the inner ring 40.

In this manner, an assembly is obtained which is blocked in rotation of the inner ring 40 on the shaft 8, including a little flexibility allowing avoiding noise when stresses are applied to this inner ring.

Advantageously, the elastic ring 42 is made of an elastomer having a glass transition temperature comprised between −80° C. and +30° C., which is preferably close to −40° C. For this, it is possible to use in particular a material of the thermoplastic elastomer type, an ethylene-propylene-diene monomer «EPDM», a butadiene-acrylonitrile «NBR», a hydrogenated butadiene-acrylonitrile «HBNR», or a silicone.

The rear tips 48 on the axial toothings of the outer ring 50 and the front tips of the inner ring 40 facilitate the insertion of the teeth of this outer ring between those of the inner ring when the front shaft 8 moves back.

In addition, advantageously, a longer tooth is made on each ring 40, 50, having an extension facing the other ring of about 0.5 to 3 mm, preferably 1 mm, which is slightly angularly offset, so as to prepare an engagement of the rest of the teeth by a small angular rotation if necessary. This small rotation is made possible by the deformable nature of the elastic ring 42, which allows a small rotation of the inner ring 40 around the rear shaft 8 such that the teeth of the two rings 40, 50 can cooperate together without blocking each other.

An open elastic clip 44 is fastened in a groove of the rear shaft 8 on each side of the inner ring 40, to maintain the axial position of this ring and of the elastic annulus 42.

FIGS. 7a and 7b respectively show the maximum front position A and the maximum rear position B for depth adjustment of the steering wheel, carried out by the motorization 30 within the framework of the normal driving of the vehicle, with an adjustment range PR comprised between these two maximums, which is generally 30 to 50 mm.

FIG. 7c shows a locking position C systematically disposed each time the vehicle stops by the motorization 30, after the driver has switched off the ignition, by moving back the guide tube 12 so as to align the outer ring 50 on the inner ring 40 after having engaged the teeth thereof with each other.

A locking of the steering is carried out in a simple and cost-effective manner, with very few added components, by using the motorization 30 and its control circuit, which are already existing, for the depth adjustment of the steering wheel.

It should be noted that the locking position C being clearly moved back relative the depth adjustment range PR of the steering wheel, frees up a space in front of this steering wheel which makes it easier for the driver to enter or exit the vehicle.

FIG. 7d shows a position after an accident D obtained from a position within the adjustment range PR, where the driver has applied a significant force on the steering wheel which deforms by completely unwinding the curved metal blade 28, to dispose the guide tube 12 in rear stop after having passed through the damping range PA coming after this adjustment range.

In this case the outer ring 50 is passed above the inner ring 40 to go behind it without being blocked by this inner ring, which makes the steering completely free in order to be able to meet some regulatory requirements imposing in this case a possible maneuver of the steering with the steering wheel.

Alternatively, the assembly of the inner ring 40 may include an axial force fuse, comprising for example elastic clips 44 made of plastic material, allowing, by a breakage under the effect of an impact in the case of an accident, a complete backward movement of the front shaft 16 in the case where the toothings of the two rings 40, 50 abut on each other without being able to be angularly aligned to free the passage.

Alternatively, any other arrangement of the rings 40, 50 can be used. It is in particular possible to provide a system for sliding in rotation the outer ring 50 relative to the guide tube 12, for a sufficiently high torque threshold, preferably in the range of 150 Nm, in order to avoid damage to the steering column in the case where a malicious person would apply a high torque on the steering wheel in an attempt to break its lock. It is also possible to dispose the rings 40, 50 axially at other places in the movable support 2.

The invention claimed is:

1. A steering column for a motor vehicle including two telescopic drive shafts linked in rotation, allowing an axial sliding of a front shaft of the telescopic drive shafts supporting a steering wheel, successively over, starting from the most forward position, a first range of depth adjustment of the position of the steering wheel, then a second damping range used in the case of an accident for damping an impact of the driver on the steering wheel, the column including an electric motorization for controlling the sliding, and an anti-theft blocking device to be engaged, when engaged the anti-theft blocking device being able to block the rotation of one of the telescopic drive shafts, wherein when the rotational blocking device is engaged for blocking the front shaft, the front shaft is placed at an axial position given by the motorization, the axial position being located in the second damping range.

2. The steering column according to claim 1, wherein the axial position for blocking the front shaft is disposed before the end of a stroke of the second damping range.

3. The steering column according to claim 1, wherein the rotational blocking device includes an inner ring having axial teeth on an outer contour thereof, which are engaged between axial teeth disposed in an outer ring.

4. The steering column according to claim 3, wherein the axial teeth of the inner ring and the axial teeth of the outer ring axially have tips on the side of the engagement of the inner ring and the outer ring.

5. The steering column according to claim 4, wherein the inner ring and the outer ring axially have a tip projecting axially beyond the other tips on the side of the engagement of the inner ring and the outer ring.

6. The steering column according to claim 3, wherein the sliding system includes an elastic annulus forming slots, disposed between one of the rings and a part supporting the one of the rings.

7. The steering column according to claim 3, wherein an axial fuse system includes elastic clips made of plastic material, axially holding at least one of the rings.

8. The steering column according to claim 3, wherein the rotational blocking device includes the inner ring fastened on a rear shaft, and the outer ring fastened inside a guide tube carrying out a guide of the front shaft.

9. The steering column according to claim 1, wherein the rotational blocking device includes a rotational sliding system limiting torque transmitted by the device.

10. The steering column according to claim 1, wherein the rotational blocking device includes an axial fuse system which can be broken in the case of an accident under the effect of an axial force when contacting two portions of the rotational blocking device, during the displacement of the front shaft in the second damping range.

11. A method for controlling a steering column according to claim 1, comprising controlling the electric motorization systematically after switching off ignition of the vehicle to have the front shaft in the axial position for blocking in rotation.

* * * * *